(12) United States Patent
Lou

(10) Patent No.: US 7,237,132 B2
(45) Date of Patent: Jun. 26, 2007

(54) POWER REDUCTION FOR UNINTENTIONAL ACTIVATION OF A WIRELESS INPUT DEVICE USING A FLIP-FLOP TO DETECT EVENT TERMINATION

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 297 days.

(21) Appl. No.: 10/824,312

(22) Filed: Apr. 14, 2004

(65) Prior Publication Data

US 2005/0235169 A1 Oct. 20, 2005

(51) Int. Cl.
*G06F 1/32* (2006.01)
(52) U.S. Cl. ......................................... 713/323; 341/22
(58) Field of Classification Search .................. 341/22; 713/323
See application file for complete search history.

(56) References Cited

U.S. PATENT DOCUMENTS 5,384,721 A * 1/1995 Joto ............................ 713/321
5,861,822 A * 1/1999 Park et al. ..................... 341/22
2005/0078093 A1* 4/2005 Peterson et al. ............ 345/173

FOREIGN PATENT DOCUMENTS

EP 567957 A1 * 11/1993

* cited by examiner

*Primary Examiner*—Chun Cao
*Assistant Examiner*—Albert Wang

(57) ABSTRACT

An improved method and apparatus for reducing power consumption of a wireless input device when the wireless input device is unintentionally activated, and thereby significantly reduces the amount of power needed to operate the associated circuitry over an extended period of time.

In one embodiment, an unintentional activation of the wireless input device is detected; power consuming circuitry of the wireless input device is disabled responsive to the detection; a removal of the unintentional activation of the wireless input device is detected; and the power consuming circuitry of the wireless input device for normal operation is enabled.

26 Claims, 10 Drawing Sheets

POWER REDUCTION FOR UNINTENTIONAL ACTIVATION OF A WIRELESS INPUT DEVICE USING A FLIP-FLOP TO DETECT EVENT TERMINATION

FIELD OF THE INVENTION

The present invention relates generally to wireless digital devices; and more particularly to wireless user input devices to communicate with computers.

BACKGROUND OF THE INVENTION

There are many user input devices for use with a digital computer, including standard keyboards, touchpads, mice and trackballs. Wireless communication technology has advanced rapidly over the past few years and there has been rapid development of wireless technologies for providing communication between input/output devices and their "host" computers. For example, wireless keyboards and mice now couple via wireless connections to their host computers. These "wireless" input devices are highly desirable since they do not require any hard-wired connections with their host computers. However, the lack of a wired connection also requires that the wireless input devices contain their own power supply, i.e., that they be battery powered.

In order to extend the life of its batteries, a wireless input device often supports power saving modes of operation. For example, the wireless input device may include circuitry to provide for various levels of power-down modes to reduce power consumption when the device is inactive. When activity is detected, the interface circuitry transitions to a power-up mode to facilitate communications between the user interface device and the computer and then returns to a power-down mode after a predetermined interval of inactivity of the user interface device.

However, when the wireless input device is unintentionally activated, for example when an object is accidentally placed on the wireless input device, the wireless input device is forced back to the power-up mode and starts consuming substantial power. This results in a significantly reduced battery life for the wireless input device.

Thus, there is a need in the art for a method and apparatus for reducing power consumption of a wireless input device when the wireless input device is unintentionally activated.

SUMMARY OF THE INVENTION

The present invention provides an improved method and apparatus for reducing power consumption of a wireless input device when the wireless input device is unintentionally activated, and thereby significantly reduces the amount of power needed to operate the associated circuitry over an extended period of time.

In one embodiment, the present invention is directed to a method and apparatus for reducing power consumption of a wireless input device when the wireless input device is unintentionally activated. An unintentional activation of the wireless input device is detected; power consuming circuitry of the wireless input device is disabled responsive to the detection; a removal of the unintentional activation of the wireless input device is detected; and the power consuming circuitry of the wireless input device for normal operation is enabled.

BRIEF DESCRIPTION OF THE DRAWINGS

The objects, advantages and features of this invention will become more apparent from a consideration of the following detailed description and the drawings, in which.

DETAILED DESCRIPTION

In one embodiment, the present invention is directed to a method and apparatus for reducing power consumption of a wireless input device when the wireless input device is unintentionally activated. When, for example, a key in a wireless keyboard is confirmed accidentally pressed, a detection logic coupled to keyboard row inputs is enabled and is used to detect a transition of the row inputs to the opposite state. The power consuming circuitry (e.g., key scan block, control logic, and the related clocks) of the wireless input device is then turned off. When the opposite state is detected by for example, an asynchronous logic, the power consuming circuitries are turned back on and the wireless input device resumes its normal operation. Although, the specification uses a wireless keyboard, and mouse as examples for a wireless input device, the described embodiments below are not limited to wireless keyboards and mouse. Other wireless input devices, such as microphones, sensors, etc. are well within the scope of the present invention.

Preferably, the detection logic is asynchronous. In this case, the detection logic consumes a negligible amount of power. In addition to negligible amount of power consumption, the present invention has a low latency because there is no running clock involved in the asynchronous logic.

Figure 1:
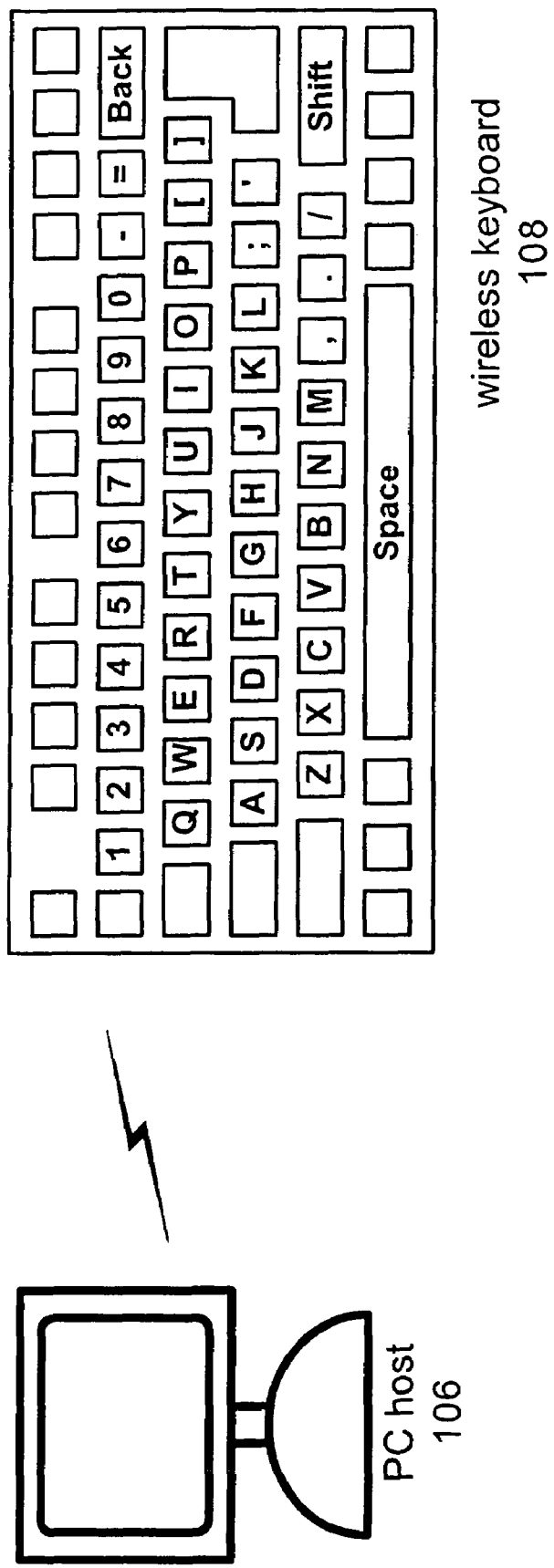
FIG. 1 is an exemplary system diagram illustrating a PC host and a wireless keyboard that includes a detection means, according to one embodiment of the present invention.

FIG. 1 is a system diagram illustrating a personal computer (PC) host 106 and a wireless input device (e.g., keyboard 108) that includes a wireless interface device and detection means, according to one embodiment of the present invention. The wireless input device is battery powered and operates for extended periods of time on a single set of batteries because of the reduced power consumption operations according to the present invention.

Figure 2:
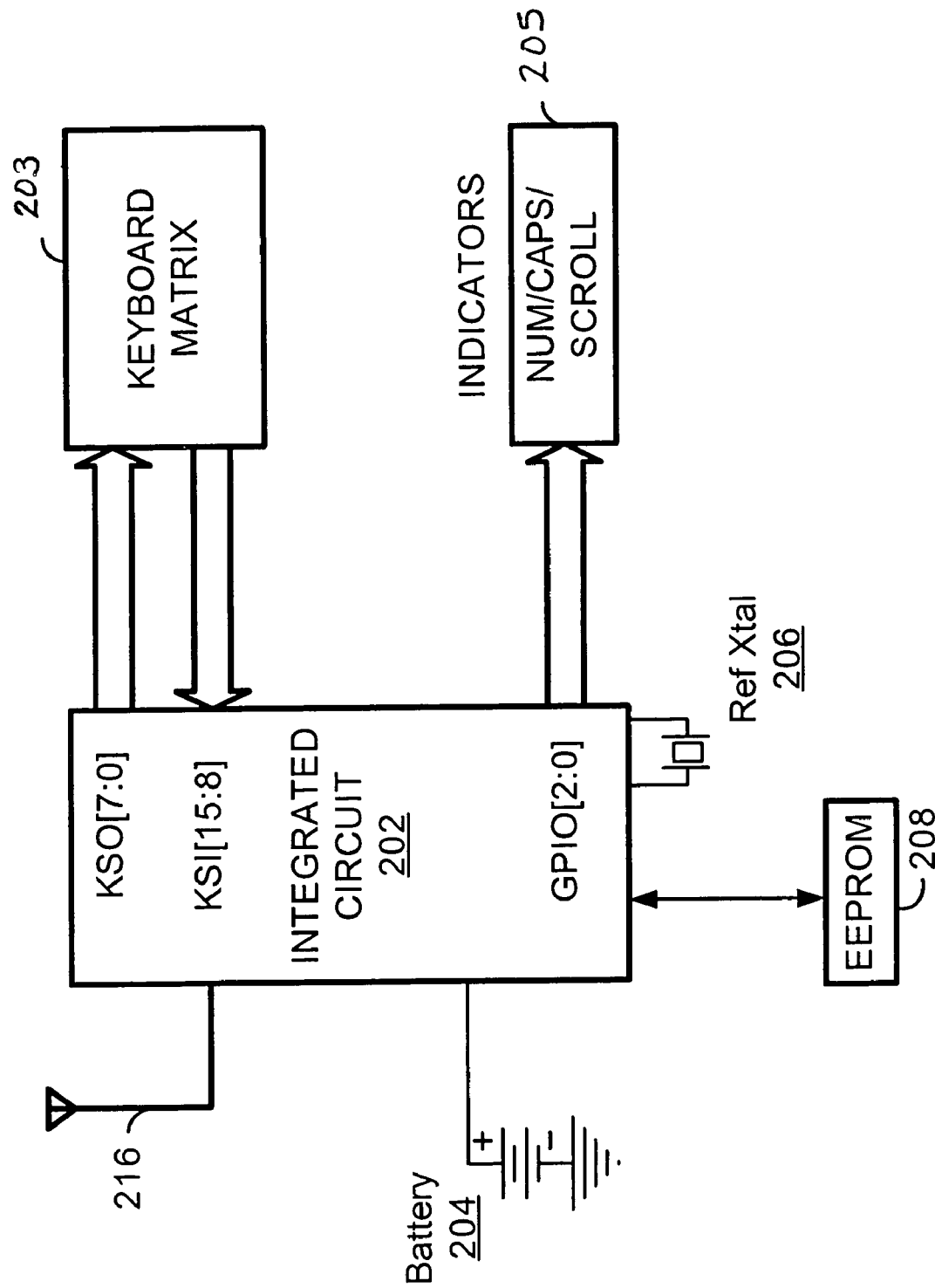
FIG. 2 is an exemplary schematic block diagram illustrating the structure of a wireless keyboard that includes a wireless interface device constructed, according to one embodiment of the present invention.

FIG. 2 is a schematic block diagram illustrating the structure of a wireless keyboard matrix 203 that operates in conjunction with a wireless interface device (e.g., an integrated circuit 202), according to one embodiment of the present invention. As shown in FIG. 2, wireless interface device 202 services a key scan matrix 203 that provides inputs from the keyboard. The wireless interface device 202 couples to a battery 204, a crystal 206, an EEPROM 208, and an antenna 216. Indicators 205 include number, capitals, and scroll lights that are lit on the keyboard.

In another embodiment (not shown in FIG. 2), an integrated circuit services both mouse and keyboard input and may reside internal to either the mouse or the keyboard. In this embodiment, as will be apparent to those skilled in the art, multiplexing or signal sharing may be required, because the input signals differ. However, different signal lines may be dedicated for keyboard and for mouse inputs such that no signal sharing is required.

Figure 3:
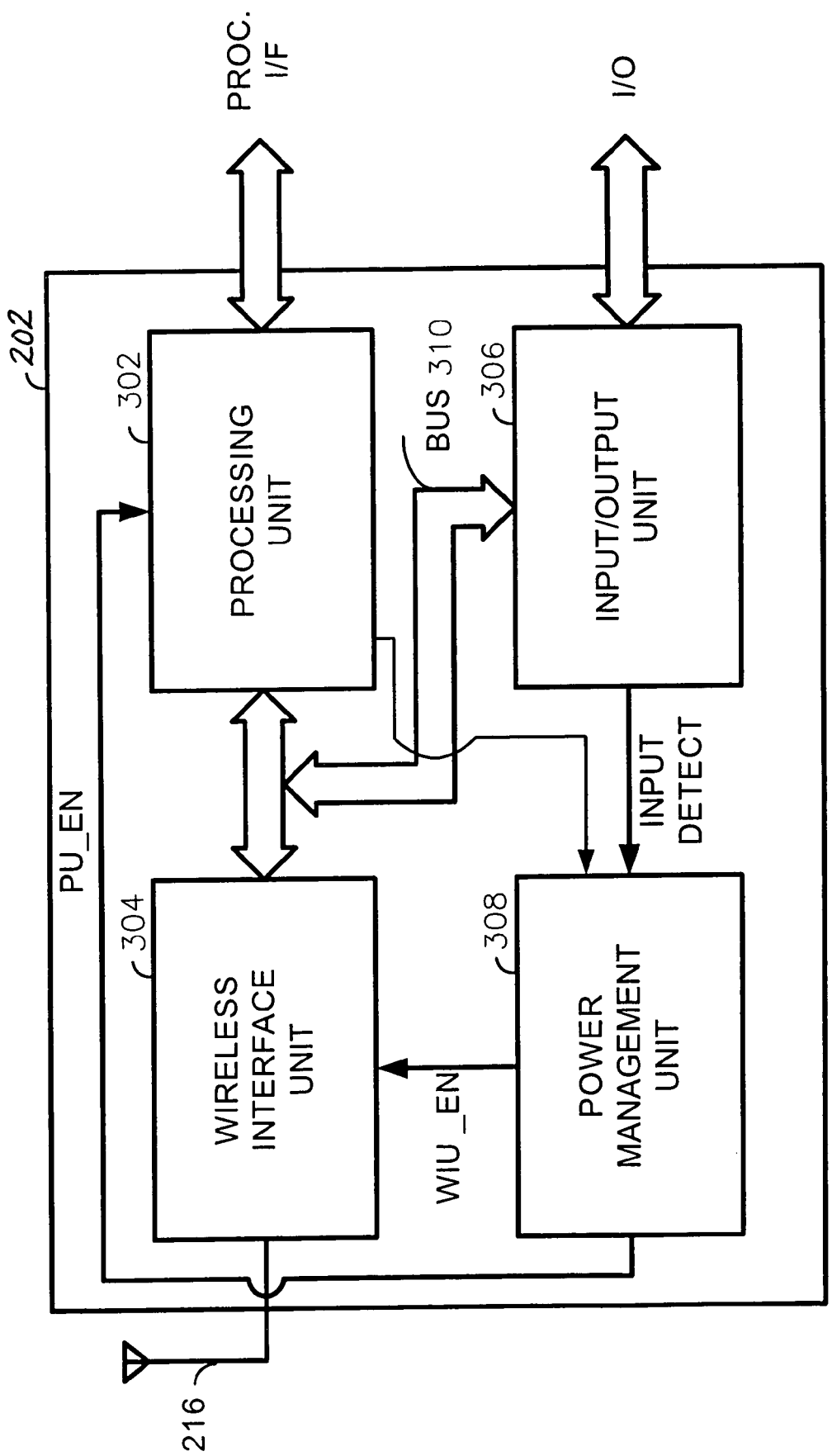
FIG. 3 is an exemplary block diagram illustrating a wireless interface device, according to one embodiment of the present invention.

FIG. 3 is a block diagram illustrating a wireless interface device, according to one embodiment of the present invention. As shown in FIG. 3, the wireless interface device 202 includes a processing unit 302, a wireless interface unit 304, an input/output unit 306, and a power management unit 308. The wireless interface unit 304 couples the wireless interface device 202 to antenna 216. In a power down mode (explained below), the power management unit 308 operates voltage regulation circuitry of the processing unit (via PU_EN signal) and the wireless interface unit (via WIU_EN signal) to power down the processing unit 302 and wireless interface unit 304, respectively.

The wireless interface unit 304 can be adapted to operate according to the Bluetooth specification and in particular to the Human Interface Device (HID) portion of the Bluetooth specification. It will be understood by those skilled in the art, however, that the present invention can be adapted to work in conjunction with other wireless interface standards.

Processing unit 302, wireless interface unit 304, and input/output unit 306 couple with one another via a system bus 310. Processing unit 302 includes a processing interface that may be used to couple the processing unit to one or more devices. Input/output unit 306 includes an input/output set of signal lines that couple the wireless interface device 202 to at least one user input device, such as a mouse or a keyboard.

Figure 4:
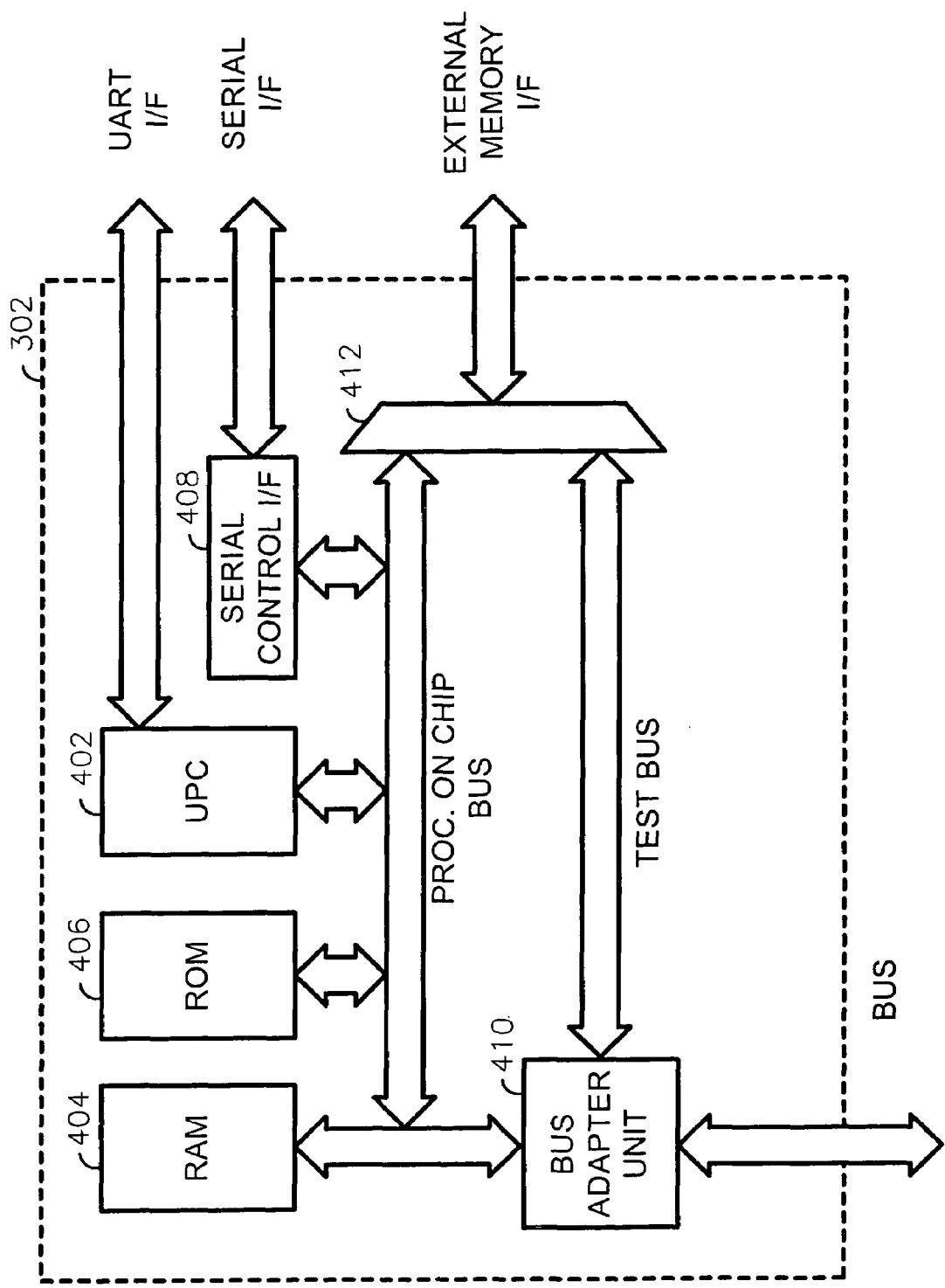
FIG. 4 is an exemplary block diagram illustrating a processing unit of a wireless interface, according to one embodiment of the present invention.

FIG. 4 is a block diagram illustrating a processing unit 302 of the wireless interface device of FIG. 3. The processing unit 302 includes a microprocessor core 402, read only memory 406, random access memory 404, serial control interface 408, bus adapter unit 410, and multiplexer 412. The microprocessor core 402, ROM 406, RAM 404, serial control interface 408, bus adapter unit 410, and multiplexer 412 couple via a local bus. Multiplexer 412 multiplexes an external memory interface between the local bus and a test bus. The bus adapter unit 410 interfaces local bus with the system bus. The microprocessor core 402 includes a universal asynchronous receiver transmitter interface that allows direct access to the microprocessor core. Further, the serial control interface 408 provides a serial interface path to the local bus.

Figure 5:
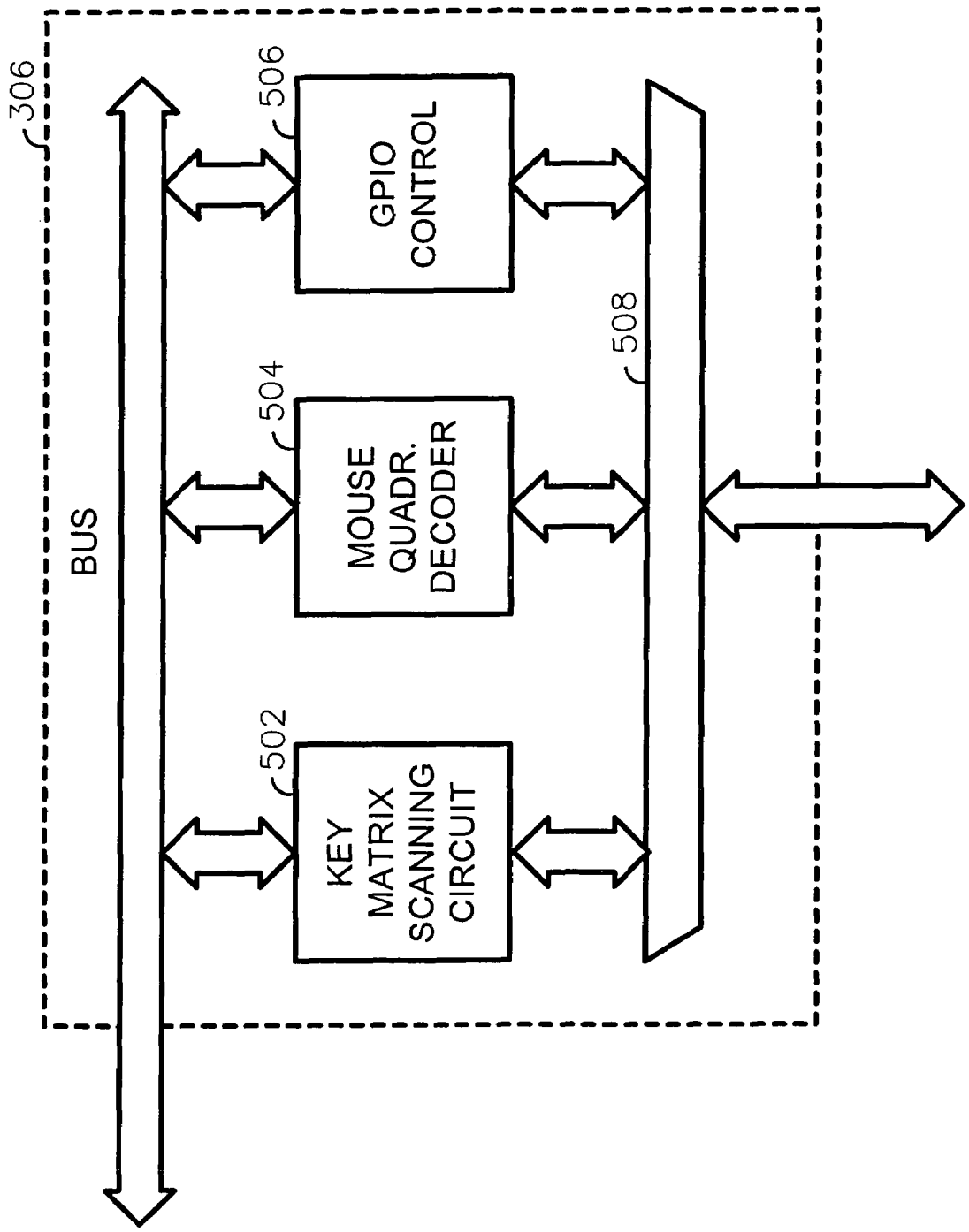
FIG. 5 is an exemplary block diagram illustrating an input/output unit of a wireless interface, according to one embodiment of the present invention.

FIG. 5 is a block diagram illustrating the input/output unit 306 of the wireless interface device of FIG. 3. The input/output unit 306 includes a keyboard scanning block 502, a mouse quadrature decoder block 504, and a general purpose input output (GPIO) control block 506. The GPIO control block 506 is capable of enabling/disabling the input/outputs and control the direction of data, that is as an input or an output, as described below with reference to FIG. 7.

Each of the keyboard scanning block 502, the mouse quadrature decoder block 504, and the GPIO control block 506 couple to the bus. Further, each of the keyboard scanning block 502, the mouse quadrature decoder block 504, and the GPIO control block 506 couple to I/O via multiplexer 508. This I/O couples to at least one user input device.

In another embodiment of the input/output unit 306, each of the keyboard scanning block 502, the mouse quadrature decoder block 504, and the GPIO control block 506 couples directly to external pins that couple to at least one user input device.

Figure 6:
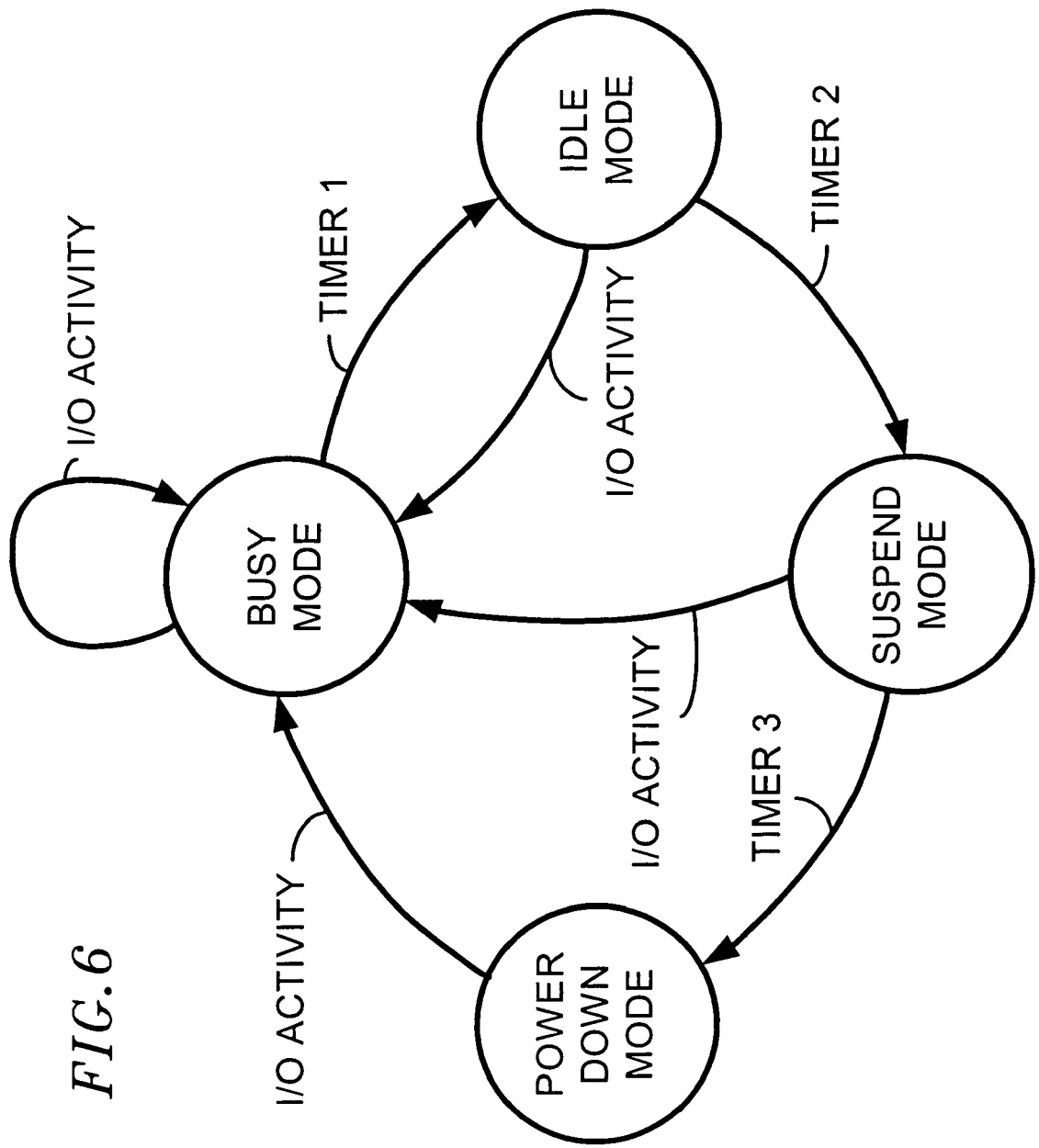
FIG. 6 is an exemplary state diagram illustrating operation, according to one embodiment of the present invention.

FIG. 6 is an exemplary state diagram illustrating operation of the wireless interface device 202, according to one embodiment of the present invention. As shown, the wireless interface device includes four separate power-conserving modes, a busy mode, a idle mode, a suspend mode and, a power down mode. The state diagram of FIG. 6 shows each of these modes and how each of these modes is reached during normal operation. In one embodiment, the power management unit (e.g.,308 in FIG. 3), under control of the processing unit, operates voltage regulation circuitries of the processing unit and the wireless interface unit to operate the four separate power-conserving modes of the wireless interface device 202.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs, as shown.

If I/O activity occurs while in the idle mode, operation returns to the busy mode. When in the idle mode, if timer 2 expires with no additional I/O activity, suspend mode is entered. While in suspend mode, if I/O activity occurs, operation returns to busy mode. However, if no additional I/O activity occurs while in suspend mode before the expiration of a third timer, power down mode is entered. While in the power down mode, operation will remain in the power down mode until I/O activity occurs. When I/O activity occurs, operation of the wireless interface device will move from the power down mode to the busy mode.

Figure 7:
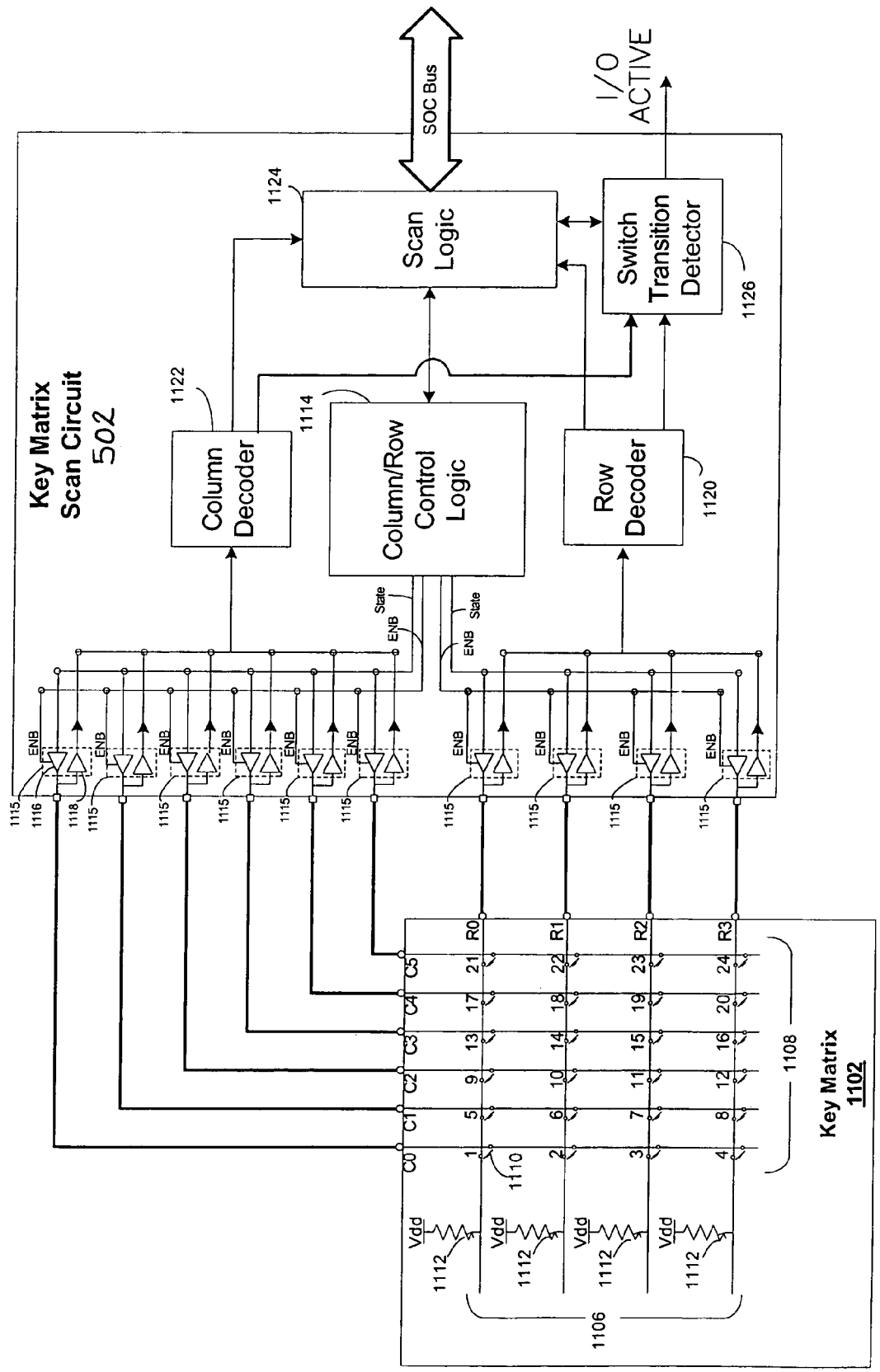
FIG. 7 is an exemplary illustration of the keyboard scan circuit components according to one embodiment of the present invention.

FIG. 7 is an illustration of a keyboard switch matrix 1102 connected to a key matrix scan circuit 502. The keyboard matrix 1102 comprises a plurality of columns 1108 and a plurality of rows 1106. In the exemplary embodiment shown in FIG. 7, the plurality of columns 1108 comprises six columns C0–C5 and the plurality of rows comprises four rows, R0–R3. For simplicity reasons, the embodiment illustrated in FIG. 7 shows only a small portion of an actual keyboard matrix. It is understood by those skilled in the art that the number of rows and columns can be increased or decreased depending on the specific application.

A plurality of switches 1110 connect the respective rows and columns when a corresponding key is pressed by a user. In this example, switch 1110 connects row R0 and column C0 when the switch 1110 is pressed. Although a reference numeral has not been provided for each of the switches, it should be understood that a total of 24 switches 1110 are associated with the intersection of the rows and columns in FIG. 7. For purposes of discussion, the twenty-four illustrative switches 1110 in FIG. 7 are referred to as Switch 1, Switch 2, . . . , Switch 24. When all of the respective switches in a particular row are open, the row is pulled "high" by resistor 1112 that is connected to Vdd. Rows R0–R3 provide inputs to row decoder 1120 in the key matrix scan circuit 502, as will be discussed in greater detail below.

Key matrix scan circuit 502 comprises column/row control logic 1114 and driver logic 1115 that generate appropriate signals to control the state of the respective columns and rows. Driver logic 1115 comprises a tri-state driver 1116 and a buffer 1118. The column/row control logic 1114 generates appropriate "high" and "low" signals that are provided to the inputs of the tri-state drivers 1116. The column/row control logic can change the state of a particular row or column by generating appropriate "enable" signals that control the operation of the tri-state drivers 1116 in the control logic 1115. For example, if the input of the tri-state driver 1116 is "high," the generation of an enable signal will cause the tri-state driver 1116 to apply the "high" signal at its output to drive the column or row "high." Conversely, if the input to the tri-state driver 1116 is "low," the generation of an enable signal will cause that tri-state driver to drive the column or row "low." The enable signals can be global enable signals intended to enable the tri-state drivers for all rows, e.g. ENB_R, or for all columns, e.g. ENB_C. The enable signals also can be directed to a tri-state driver for a particular row, e.g. ENB_R1, or for a particular column, e.g. ENB_C3.

The key matrix scan circuit 502 also comprises row decoder 1120 and column decoder 1122 that are operable to decode output signals received from the respective rows and columns in the keyboard matrix 1102. The decoded output signals from the row decoder 1120 and the column decoder 1122 are provided to scan logic 1124 which generates a data stream indicating the state of various switches (keys) 1110.

The key matrix scan circuit 502 also comprises a switch transition detection circuit 1126 that receives output signals from the row decoder 1120 and the column decoder 1122. The switch transition detection circuit 1126 is communicatively coupled to the scan logic 1124 which scans the various rows and columns as described hereinbelow. In addition, the switch transition detection circuit 1126 generates an "I/O Active" signal that is provided to the input/output unit 306 (in FIG. 3) to cause the system to transition into the "busy" mode as described above.

Figure 8:
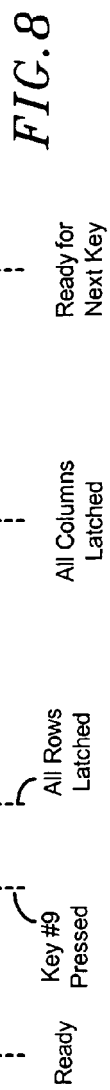
FIG. 8 is an exemplary timing diagram illustrating operation of the keyboard matrix circuitry operating, according to one embodiment of the present invention.

Operation of the keyboard scan circuitry can be understood by referring to the timing diagram of FIG. 8. Referring to FIG. 8, the initial state of all of the rows and columns is analyzed beginning at the "Ready" reference line. The transitions to the left of the "Ready" reference are provided simply to clarify the "high" or "low" status of the rows and columns when processing begins. Beginning at the "Ready" reference point, ENB_C is high (active) and all columns are driven low by the tri-state drivers 1116. All of the rows are pulled high via the resistors 1112 shown in FIG. 7.

If, as an example, Switch (Key) #9 is pressed, R0 transitions from "high" to "low." This transition is used as a trigger to latch (store) all row values. This transition also causes ENB_C to transition from "high" to "low." Since ENB_C is "low," the columns are no longer being driven and, therefore, R0 transitions back to "high." The actual transition of R0 to "high" will be delayed somewhat by the RC constant combination of the line capacitance of column C2 and the resistor 1112. Since switch #9 is still pressed, the column C2 will transition to "high." The "low" to "high" transition of column C2 is used as a trigger to latch all column values. After the column values have been latched, ENB_C transitions from "low" to "high" and column C2 transitions from "high" to "low." All other columns are also maintained in the "low" state since ENB_C is now high (active).

In the example shown in FIG. 8, there is one high latched column value (C2) and one low latched row value (R0). The single latched column and the single latched row uniquely identify a single key switch (switch #9) and, therefore, there is no need to enter into a "scan" of other rows and columns. Thus the scan signal remains "low" during the entire cycle.

The column/row control logic 1114, in conjunction with the driver logic 1115, is operable to generate all of the control signals necessary to control the state transitions described above. Furthermore, the switch transition detection circuit 1126 is operable to generate a "I/O Active" signal for the input/output unit 406 immediately upon receiving an output signal from the row decoder 1120 and/or the column decoder 1122 indicating that a switch has been activated. In this example the "I/O Active" signal is generated immediately by the switch transition detection circuit 1126 immediately upon detection of the transition of row R0 from "high" to "low" as a result of switch #9 being activated.

Now, if an object, such as a book, is unintentionally placed on the keyboard (or a mouse), activating a key, such as key #9, the system returns to the busy mode (in FIG. 6), for example, from power down mode. The system then activates all of the control logic shown in FIG. 7 and starts transmitting the key information to the host (e.g., processor unit 302 of FIG. 3). As a result, the battery life of the wireless keyboard would substantially suffer.

Figure 9:
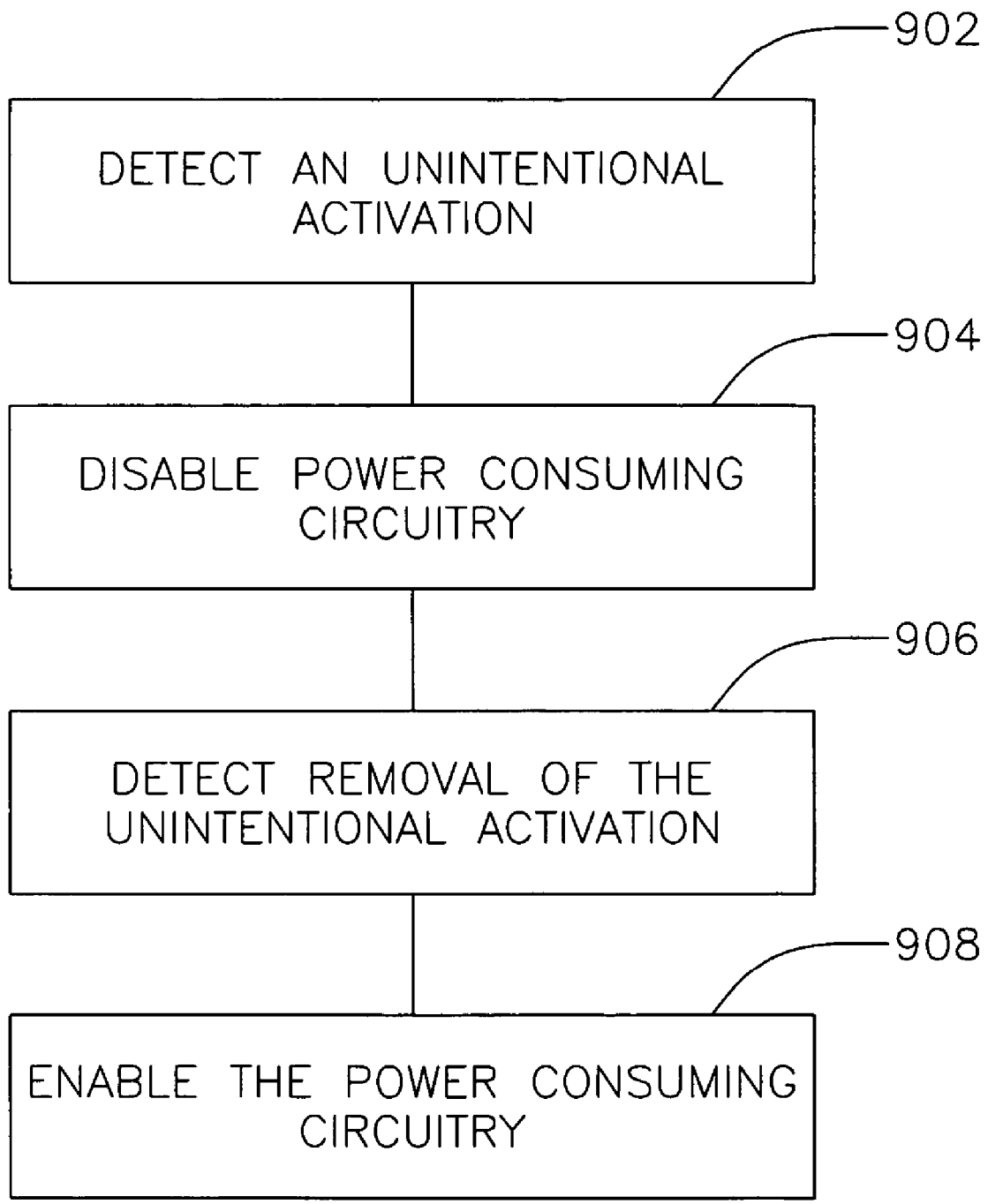
FIG. 9 is an exemplary flowchart representation of a process to reduce power consumption of a wireless input device when the wireless input device is unintentionally activated, according to one embodiment of the present invention.

FIG. 9 is an exemplary flowchart representation of a process to reduce power consumption of a wireless input device when the wireless input device is unintentionally activated, according to one embodiment of the present invention. In block 902, an unintentional activation of the wireless input device, for example, an object-on-a-key, is detected. Activation of the key (or several keys) is first detected by the methods described above. If the same key (or keys) remain activated for a predetermined amount of time, for example, more than few milliseconds that takes a typical key activation for a normal operation, an object-on-a-key is detected. This may be implemented by a timer that starts timing upon activation of the key. The timer function is well known in the art and may be implemented in the power management unit (e.g., as a counter) or the processing unit (e.g., as a software timer or hardware counter).

Upon detection of an object-on-a-key, the power consuming circuitry, such as control logic, related clocks and other related circuitry are disabled to save power consumption of the wireless input device, as shown in block 904. In one embodiment, the processing unit detects the object-on-a-key and then disables the control logic and clocks via the power management unit that controls the voltage regulation circuitries of the processing unit and the wireless interface unit. In one embodiment, if the processing unit has a power saving mode (e.g., idle mode), the processing unit may also be disabled (e.g., via the power management unit).

In block 906, removal of the unintentional activation of the wireless input device (e.g., the object from the key) is detected. In one embodiment, when the object is removed from the key(s), an edge in the timing of the corresponding row(s) is detected. The detected edge then causes the processing unit to enable the control logic and clocks, as shown in block 908. If the processing unit is in a power saving mode, the detected edge "wakes" the processing unit (e.g., via an interrupt) and the processing unit enables the control logic and clocks.

Figure 10A:
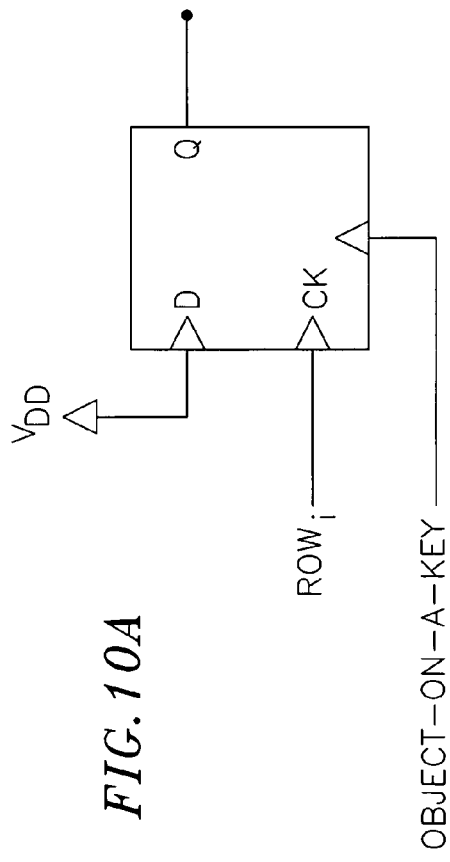
FIG. 10A is an exemplary diagram of an edge detection circuit, according to one embodiment of the present invention.
Figure 10B:
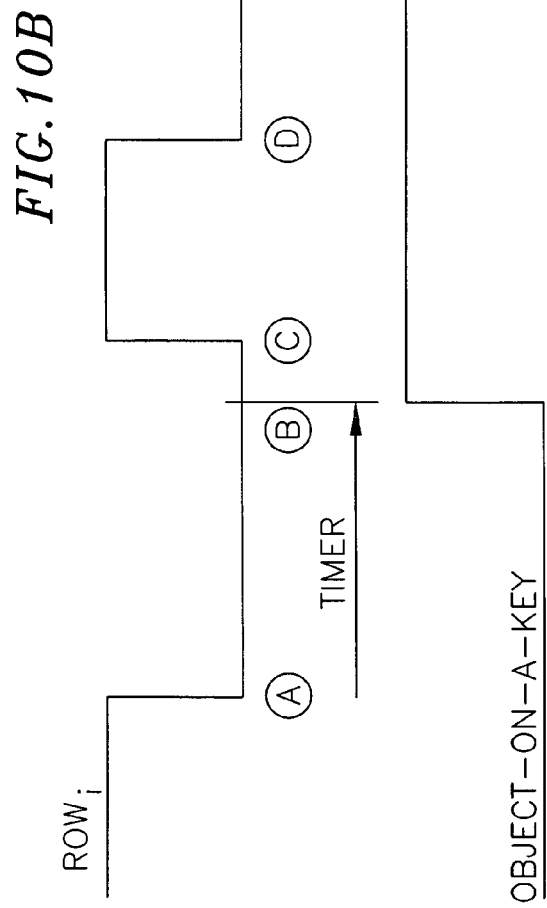
FIG. 10B is an exemplary timing diagram illustrating operation of the exemplary edge detection circuit of FIG. 10B.

FIG. 10A illustrates an exemplary circuit, and FIG. 10B depicts the related timing diagram of an asynchronous detection logic, according to one embodiment of the present invention. It is understood by those skilled in the art that a similar synchronous detection logic may be used. However, a synchronous detection logic consumes more power than an asynchronous detection logic, when in an idle mode. In one embodiment, the asynchronous detection logic is included in the power management unit, which controls the voltage regulation circuitries of the processing unit and the wireless interface unit to power down the processing unit and wireless interface unit, respectively. In another embodiment, the asynchronous detection logic may be included in the input/output unit which sends a detection signal to the power management unit to control the voltage regulation circuitries of the processing unit and the wireless interface unit.

In one embodiment, the detection circuit is a basic asynchronous flip-flop that has a Row_i signal as its input, an object-on-a-key signal as its enable input. The Data input is tied to the power supply (Vdd). This way, the flip-flop is capable of detecting an edge transition of the Row_i input and producing a high (or a low) logic at its output. In one embodiment, this flip-flop is implemented using CMOS technology. In this embodiment, when the flip-flop is not detecting any edges, it only consumes power proportional to the leakage currents of its internal (NMOS and PMOS) transistors. Since, the leakage currents are very small, the power consumption of this flip-flop is also very small, when not detecting edges.

Referring now to FIG. 10B, at time A, a key is pressed, resulting in a high-to-low transition of the Row_i signal, as described above with reference to FIG. 7. A timer is started for measuring duration of the activation of the key. If this duration is more than a predetermined amount of time, for example, more than about seventy milliseconds for a normal operation, an object-on-a-key is identified (detected), at time B. Subsequently, the key scan and related logic is disabled to reduce power consumption of the key board, resulting in a low-to-high transition of the Row_i signal at time C, due to pull-up resistors 1112 shown in FIG. 7. A generated object-on-a-key signal enables the edge detection flip-flop, as shown in FIG. 10A.

At this time, if the processing unit is not disabled as a result of the power saving mode of the key board, the processing unit causes the Row_i signal to transition back to a low state, at time D. However, if the processing unit is disabled as the result of the power saving, a "flag" signal generated by the low-to-high transition of the Row_i signal at time C, causes the Row_i signal to transition back to a low state, at time D. When the object is removed from the keyboard, Row_i signal transitions again from a low to a high state at time E, as explained above with reference to FIG. 7. This low-to-high transition is detected by the flip-flop. As a result of this removal detection, the disabled power consuming circuits are enabled and resumed for normal operation. Also, the flip-flop is now cleared, using a signal generated after the removal detection.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for reducing power consumption of a wireless input device, the method comprising:
   detecting an event;
   determining that the event is indicative that the wireless input device was unintentionally activated;
   disabling circuitry included in the wireless input device in response to the detection of the event;
   detecting termination of the event using a flip-flop adapted to detect a signal corresponding with the termination of the event; and
   enabling the disabled circuitry in response to the detecting of the termination of the event.

2. The method of claim 1, wherein the detecting of the termination of the event comprises asynchronously detecting the termination of the event.

3. The method of claim 1, wherein the detecting of the termination of the event comprises synchronously detecting the termination of the event.

4. The method of claim 1, wherein the wireless input device comprises a keyboard.

5. The method of claim 1, wherein the wireless input device comprises a mouse.

6. The method of claim 1, wherein the detecting of the event comprises detecting an event indicative of an object being persistently placed on the wireless input device.

7. The method of claim 1, wherein the determining that the event is indicative that the wireless device was unintentionally activated comprises:
   detecting activation of the wireless input device in response to the event; and
   detecting persistence of the event for a predetermined period of time after the activation of the wireless input device.

8. The method of claim 1, wherein disabling the circuitry comprises disabling the circuitry with a processing unit.

9. The method of claim 1, wherein the wireless input device comprises a processing unit and disabling the circuitry of the wireless input device comprises disabling the processing unit and related control logic of the wireless input device.

10. The method of claim 1, wherein the detecting of the termination of the event comprises detecting an edge of a signal generated as a result of the termination of the event.

11. The method of claim 1, wherein enabling the disabled circuitry comprises enabling the disabled circuitry with a processing unit.

12. The method of claim 1, wherein the wireless input device includes a processing unit and enabling the disabled circuitry comprises enabling the processing unit and related control logic of the wireless input device.

13. A wireless input device comprising:
   means for detecting an event,
   means for determining that the event is indicative that the wireless input device was unintentionally activated;
   means for disabling circuitry of the wireless input device in response to the detection of the event;
   means for detecting the termination of the event comprising a flip-flop adapted to detect a signal corresponding with termination of the event; and means for enabling the power consuming disabled circuitry of the wireless input device for normal operation.

14. The wireless input device of claim 13, wherein the means for detecting the termination of the event comprises means for asynchronously detecting termination of the event.

15. The wireless input device of claim 13, wherein the means for detecting the termination of the event comprises means for synchronously detecting termination of the event.

16. The wireless input device of claim 13, wherein the wireless input device comprises a keyboard.

17. The wireless input device of claim 13, wherein the wireless input device comprises a mouse.

18. The wireless input device of claim 13, wherein the means for determining that the event is indicative that the wireless input device was unintentionally activated is adapted to:
    detect activation of the wireless input device in response to the event; and
    detect persistence of the event for a predetermined period of time after the activation of the wireless input device.

19. The wireless input device of claim 13, wherein the means for disabling the circuitry comprises a processing unit adapted to disable the circuitry of the wireless input device.

20. The wireless input device of claim 13, further comprising a processing unit, wherein the means for disabling the circuitry is adapted to disable the processing unit and related control logic of the wireless input device.

21. The wireless input device of claim 13, wherein the flip-flop is adapted to detect an edge of the signal corresponding with termination of the event.

22. The wireless input device of claim 13, wherein the means for enabling the circuitry comprises a processing unit adapted to enable the circuitry.

23. The wireless input device of claim 13, further comprising a processing unit, wherein the means for enabling the circuitry is adapted to enable the processing unit and related control logic of the wireless input device.

24. A wireless input device comprising:
    a wireless interface unit;
    a processing unit coupled to the wireless interface unit;
    an input/output unit coupled to the wireless interface unit and the processing unit; and
    a power management unit, wherein the power management unit includes:
        detection circuitry adapted to detect an event, the event being indicative of unintentional activation of the wireless input device,
        disabling circuitry adapted to disable circuitry of the wireless input device in response to the detection of the event,
        a flip-flop adapted to detect termination of the event, and
        enabling circuitry adapted to enable the disabled circuitry of the wireless input device for normal operation.

25. The wireless input device of claim 24, wherein the flip-flop is adapted to operate asynchronously.

26. The wireless input device of claim 24, wherein the flip-flop is adapted to operate synchronously.

* * * * *